Aug. 21, 1962
H. RICCI
3,050,094
SAW CHAIN
Original Filed Dec. 17, 1956
2 Sheets-Sheet 1
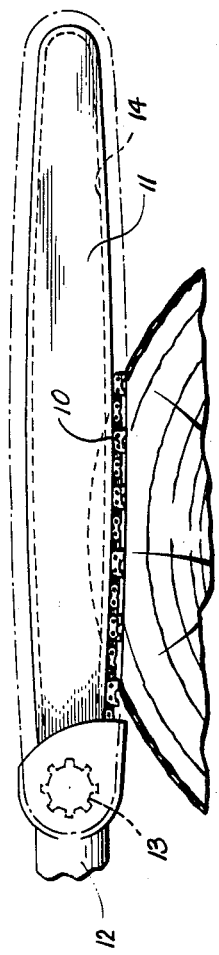
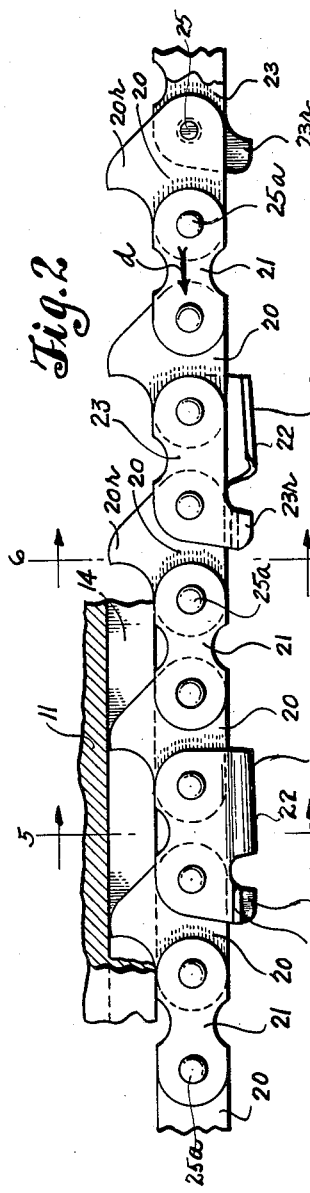
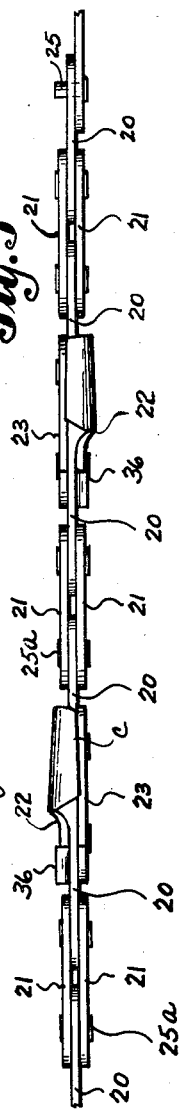
INVENTOR.
HENRY RICCI
BY
Robinson & Berry
ATTORNEYS Aug. 21, 1962        H. RICCI        3,050,094
SAW CHAIN
Original Filed Dec. 17, 1956        2 Sheets-Sheet 2
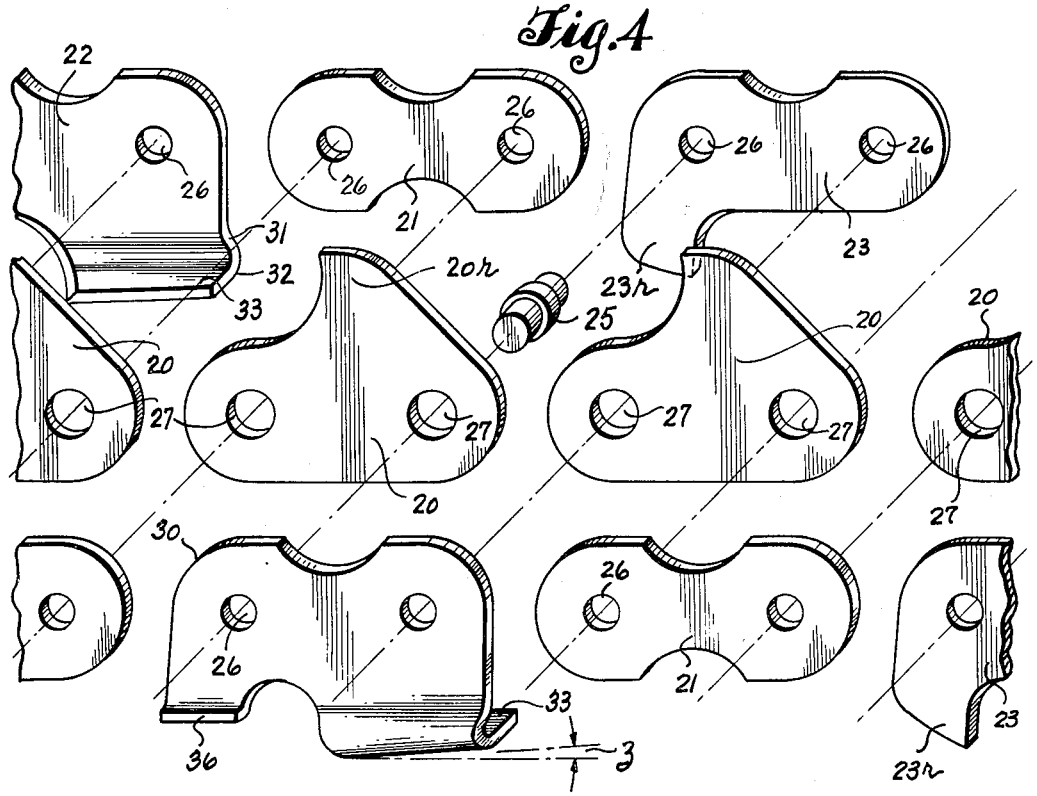
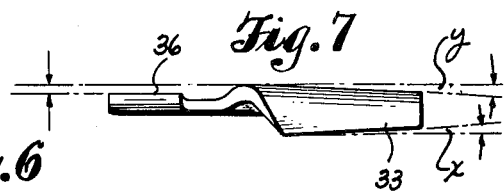
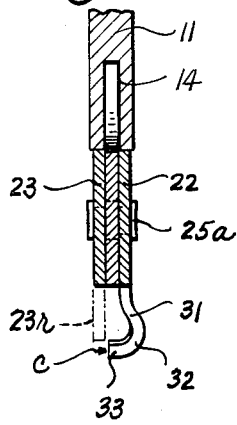
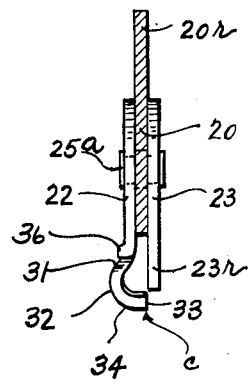
INVENTOR.
HENRY RICCI
BY
Robinson & Berry
ATTORNEYS

United States Patent Office 3,050,094
Patented Aug. 21, 1962

3,050,094
SAW CHAIN
Henry Ricci, Seattle, Wash., assignor to Outboard Marine Corporation, Waukegan, Ill., a corporation of Delaware
Original application Dec. 17, 1956, Ser. No. 628,794, now Patent No. 2,990,860, dated June 27, 1961. Divided and this application Apr. 20, 1961, Ser. No. 104,412
1 Claim. (Cl. 143—135)

This invention relates to improvements in saw chains of those types made up of a succession of pivotally joined links, embodying right and left hand cutters or routers at regularly spaced intervals therealong, operable, as the chain is driven, to cut the opposite sides and bottom of a kerf; such saw chains now being quite extensively used in logging operations. The present invention pertains more particularly to improvements in saw chains typified by that of U.S. Patent No. 2,508,784, issued on May 23, 1950.

This application is a divisional application of my application, Serial No. 628,794, filed December 17, 1956, now Patent No. 2,990,860, issued June 27, 1961.

It is the principal object of this invention to provide the cutter or router links of such chains with sidewall gauges, located forwardly of the routers, adapted to intermittently engage with corresponding sidewalls of the kerf being cut to assist in maintaining the router links in straight cutting alignment, and to thereby bring about a smoother, more efficient and better cutting action.

It is also an object of the present invention to provide those links of the chain that are paired with the router or cutter links, with depth gauges for balancing the side pull and cocking tendency of the chains.

Still further objects and advantages of the invention reside in the inter-relationship of the sidewall gauges and depth gauges to the links of the chain to which they are applied.

In accomplishing the above mentioned and other objects of the invention, I have provided the improved details of construction, the preferred forms of which are illustrated in the accompanying drawings, wherein:

FIG. 1 is a view illustrating a portion of a chain saw, and showing it as applied to a log in cutting.

FIG. 2 is a side view of a part of the saw chain, and a portion of the mounting bar along the chain operates.

FIG. 3 is a view of the cutting edge of the saw chain.

FIG. 4 is an exploded view of a part of the chain showing in perspective, the various forms of links employed in the making of a chain.

FIG. 5 is a vertical section through the chain, taken on line 5—5 in FIG. 2.

FIG. 6 is a vertical section of the chain, taken on line 6—6 in FIG. 2.

FIG. 7 is an edge view of one of the cutter links.

FIG. 8 is a perspective view of paired links as used in the chain, one being shown in dash lines for better showing of the cutter portion of the other link.

Referring more in detail to the drawings:

The present saw chain is designated in its entirety in FIG. 1 by reference numeral 10. It is there shown to be applied to a flat, elongated blade or bar 11 which, at one end, is fixedly secured to a mounting 12 that is associated with an engine, not shown. The chain 10 is driven at the mounting end of the bar 11 about an engine driven sprocket wheel designated by numeral 13. The bar 11 is formed along its longitudinal edges and about its rounded outer end with a continuous, deep cut channel 14 in which the sprocket engaging root portions of the center links are received to guide the chain in its travel, as presently will be more fully explained.

The chain 10 comprises a succession of links pivotally joined at equally spaced centers. It will be observed, more particularly by reference to FIGS. 2 and 3, that a succession of identical center links 20 herein designated as the driving or sprocket engaging links, are arranged in the central longitudinal plane of the chain. The links 20 are spaced and joined end to end along the chain by alternating pairs of side links; one of said alternating pairs comprising identical links 21—21, herein designated as "connector links," and each of the other pairs comprises a cutter or router link 22 at one side of the chain and a depth gauge link 23 at the opposite side. The router links 22 are made in "rights" and "lefts" and they alternate in their arrangement along the opposite sides of the chain. Consequently, the depth gauge links associated therewith likewise alternate in their arrangement along opposite sides of the chain as is best shown in FIG. 3.

As will be understood by reference to FIG. 2, the links of the paired sets, that is, links 21—21 and 22—23, are designed to ride at their inside or lower edges on the edge of the bar 11 along opposite sides of the slot 14 and the chain is guided in its travel and held properly in its functional relationship to the bar by means of the links 20. Each link 20 includes an extended sprocket engaging root portion 20r designed to be received and to travel in the bar slot 14. The root portions 20r also serve as sprocket teeth which coact with the sprocket wheel 13 for the driving of the chain. Operation of the chain in use is in the direction indicated by the arrow d placed thereon in FIG. 2.

The links of the chain are joined end to end by means of rivet pins or rivets 25. Preferably the opposite end portions of the rivets are of reduced diameter and project through holes 26 in the side links of the chain. The medial portions of the rivets are fitted pivotally in holes 27 in the center links. The rivets are secured in the conventional manner by forming heads 25a as illustrated in FIGS. 5 and 6.

One of the novel features of this invention resides in the provision of lateral or sidewall depth gauges on the router or cutter links 22 to hold them more stable and in alignment during operation, thus to limit or substantially reduce lateral gouging and provide smoother cutting. It is shown in the various views of the drawings, and particularly in FIG. 4, that each router link 22 comprises a flat plate-like body fomed in its opposite end portions with the holes 26 for reception of the rivets. This plate has rounded corners, as at 30, where its inner edge merges into the end edges, to insure easy operation along the bar and especially in passing over the driving sprocket wheel 13. The routing or cutting element of each link 22, designated in its entirety by reference character c, is formed at the outer edge and extends to the rear end of the plate. Each element comprises an outwardly extending portion of the plate which, in reference to its showing in FIGS. 5 and 6, is first curved outwardly, as at 31, then downwardly and inwardly as at 32 in substantially cylindrical curvature. The toe portion 33 of the cutter then extends horizontally through and beyond the central longitudinal plane of the chain. At its forward end the curved cutting element is sharpened to provide a cutting edge along its outer periphery, as at 34 in FIGS. 5 and 6. The outwardly rounded cutting edge of the element extends slightly beyond the plane of the outside face of the plate, as shown in FIGS. 4 and 5, and the cutter has a slight angle of rake along its inside and outside as indicated by the angles at $x$ and $y$ in FIG. 7. Also, there is an angle of rake along its bottom as indicated by the angle $z$ in FIG. 4. Insofar as the cutting element, and its relationship to the plate on which it is formed is concerned, it is substantially like that shown in the U.S. Patent No. 2,508,784 previously referred to.

Each of the cutter links is characterized by the provision thereon of a gauge or runner for intermittently engaging the sidewall of the kerf as cut by the chain. These gauges are designated by reference numeral 36, and each is shown to be formed along the forward end and outer edge portion of the plate. Each sidewall gauge 36 extends downwardly from the plate somewhat less than the cutter and is turned to extend outwardly a distance slightly less than the outward extent of the rounded cutting edge formed by the portions 31 and 32 as will be noted in FIG. 6.

In the operation of the chain, the sidewall gauges 36, by reason of their ability to engage the sidewall of the kerf in the event of lateral gouging, will assist in limiting or substantially reducing the lateral gouging of the cutter formed on the same link. The gauges 36 assist in producing a more even, straighter and smoother cutting operation. This reduces the power requirements and the wear and spreading of the chain. It will be noted by reference to FIG. 6 of the drawings that the gauges are so positioned relative to the cutters that they are not in constant engagement with the sidewall of the kerf, but will only engage and function when the cutter begins to gouge laterally. The lateral gouging or outward angular movement of the cutter causes the sidewall gauge on the forward end of the link to simultaneously move in the same direction and to a greater degree, so that the gauge 36 will engage and ride on the wall of the kerf and thereby limit the extent of lateral gouging by its related cutter.

Another important and principal feature of this invention resides in the provision of depth gauges formed on the side links 23 which are paired with the cutter links 22. It is shown in FIG. 2, and also in FIGS. 4 and 6, that the links 23 are substantially like the connector links 21 except that each is formed along the outside edge at its forward end with an extended runner portion 23r, commonly referred to as a "depth gauge." The depth gauge extends downwardly, in reference to its showing in FIGS. 2 and 6, to a lesser extent than the routing element c and limits or controls the depth of the cut in the bottom of the kerf. The depth gauges 23r, operate not only to gauge the depth of the bottom cut made by the cutters but also balance the side pull of the cutters, to prevent what is referred to as cocking or tipping of the links which results in gouging and rough cutting.

It will be appreciated that the new and improved chain construction provides numerous advantages. The chain cuts smoother, easier and faster. There is a substantial elimination of the tendency to gouge, tip or cock which results from router links being out of alignment to the plane of the longitudinal movement of the chain. The gauges 36 limit or reduce excessive sidewall cutting and the depth gauges 23r control the depth of the kerf. The lateral extent of the sidewall gauges is maintained to allow free travel of the chain in the kerf and free movement of the bar. As the cutters are filed and sharpened, the sidewall and depth gauges are also adjusted to compensate to the rake of the cutting elements.

What I claim as new is:

A saw chain which includes a plurality of longitudinally spaced pairs of cutter and side links, each cutter link having a cutting tooth of router shape formed thereon and the paired side link being laterally spaced from each cutter link, a plurality of connector links respectively interposed between pairs of cutter and side links and having their respective ends pivotally connected to and disposed between a cutter link and a side link of each such pair, a depth gauge formed on a link other than a cutter link forward of the cutter tooth for limiting the cutting depth of said cutter tooth, each of said cutter links, including a sidewall gauge formed on the forward end thereof and spaced from the respective cutter tooth, said sidewall gauge having a vertical height less than the vertical height of the effective lateral cutting edge of the cutter tooth, each said sidewall gauge transversely overlapping the depth gauge and having less height than said depth gauge and said side wall gauge including a portion directed at an angle away from the longitudinal center line of said saw chain and terminating inwardly of the effective lateral cutting edge of the cutter tooth.

References Cited in the file of this patent
UNITED STATES PATENTS

| | | |
|---|---|---|
| 2,508,784 | Cox | May 23, 1950 |
| 2,963,055 | Stihl | Dec. 6, 1960 |
| 2,990,860 | Ricci | July 4, 1961 |